(12) United States Patent
Dravenstott et al.

(10) Patent No.: US 9,324,076 B2
(45) Date of Patent: Apr. 26, 2016

(54) PIN CREATION SYSTEM AND METHOD

(75) Inventors: Robert E. Dravenstott, Centennial, CO (US); Brian Krzeminski, Highlands Ranch, CO (US); Laurence Martinez, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 2374 days.

(21) Appl. No.: 11/422,015

(22) Filed: Jun. 2, 2006

(65) Prior Publication Data

US 2007/0282756 A1   Dec. 6, 2007

(51) Int. Cl.
G06Q 20/40 (2012.01)
G06Q 20/38 (2012.01)
G07F 7/10 (2006.01)

(52) U.S. Cl.
CPC .......... *G06Q 20/4012* (2013.01); *G06Q 20/385* (2013.01); *G06Q 20/3823* (2013.01); *G06Q 20/40* (2013.01); *G07F 7/1008* (2013.01); *G07F 7/1025* (2013.01); *G07F 7/1016* (2013.01)

(58) Field of Classification Search
CPC ..................................... G06Q 20/40–20/4012
USPC ........................................................ 705/72
See application file for complete search history.

(56) References Cited

U.S. PATENT DOCUMENTS

| | | | |
|---|---|---|---|
| 4,390,968 A | 6/1983 | Hennessy et al. | |
| 5,363,449 A * | 11/1994 | Bestock ........... | G06Q 20/38215 705/72 |
| 7,039,809 B1 * | 5/2006 | Wankmueller ....... | G06Q 20/401 705/72 |
| 7,325,724 B2 | 2/2008 | Bonalle et al. | |
| 7,603,320 B1 * | 10/2009 | Shu .................. | G06Q 20/20 705/16 |
| 7,636,694 B1 * | 12/2009 | Wankmueller ....... | G06Q 20/108 705/64 |

OTHER PUBLICATIONS

PIN Offset Generation Algorithm (z/OS V1 R9.0 Cryptographic Services ICSF Application Programmers Guide—SA22-7522-09 Copyright IBM Corporation 1990, 2007).*
PIN Offset Generation Algorithm (z/OS V1 R9.0 Cryptographic Services ICSF Application Programmer's Guide—SA22-7522-09 Copyright IBM Corporation 1990, 2007).*
PCT International Search Report mailed Sep. 12, 2008, International Application No. PCT/US07/69584, 10 pages.

* cited by examiner

*Primary Examiner* — Calvin L Hewitt, II
*Assistant Examiner* — Cristina Sherr
(74) *Attorney, Agent, or Firm* — Kilpatrick Townsend & Stockton LLP (57) ABSTRACT

A user may select or create a PIN at a non-secure input device, such as a web-enabled personal computer. PINs are stored at a financial host in encrypted form, as PIN offsets. The user selected PIN and a corresponding account number are sent in clear text form to the host, which selects a base PIN offset corresponding to the PIN. A host security module within the host converts the base PIN offset to an actual PIN offset using the actual account number. The actual PIN offset (corresponding to the new PIN and the account number) is then stored at the financial host.

17 Claims, 7 Drawing Sheets

BASE PIN OFFSET TABLE

| PIN | BASE PIN OFFSET |
|---|---|
| 0000 | 9043 |
| ○ | ○ |
| ○ | ○ |
| ○ | ○ |
| 1234 | 7201 |
| ○ | ○ |
| ○ | ○ |
| ○ | ○ |
| 9999 | 0160 |

610

CONVERT BASE PIN OFFSET TO PIN OFFSET USING ACTUAL PAN

ACTUAL PIN OFFSET TABLE

| PAN | PIN OFFSET |
|---|---|
| XXXXXXXXXXXXXXXX | |
| ○ | |
| ○ | |
| ○ | |
| 5432109876543210 | 4F2A |
| ○ | |
| ○ | |
| ○ | |
| XXXXXXXXXXXXXXXX | |

PIN CREATION SYSTEM AND METHOD

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to systems and methods for creating a PIN (personal identification number). The invention has utility in many circumstances, such as where a consumer selected PIN is entered at a non-secure device. As an example, a non-secure device could be a personal computer running a web-based application.

PINs are used widely to provide security in various transactions, such as ATM, credit card, and other financial transactions. There are various reasons why a consumer may, from time to time, change or select his or her own PIN. As one example, the PIN may have been initially assigned by a financial institution and the consumer (e.g., bank customer or the like) may desire to change the PIN to numbers or characters that are more easily remembered by the consumer.

The handling of PINs within a financial institution are subject to stringent security measures, to avoid being improperly disclosed or misused. Many of these security measures have been formalized into industry standards, such as ISO 9564. Among other things, such standards require that when PINs are stored at a financial institution's host computer, they must always be stored in an encrypted form, so that even if the host is compromised (e.g., an unauthorized person gets access), the actual PINs would not be recognizable.

An encrypted PIN stored at a financial host is often referred to as a PIN offset. The PIN offset is a string of characters calculated by combining and encrypting both the consumer account number (often referred to as a PAN or Primary Account number) and the actual PIN. It is irreversible (it cannot be mathematically reversed or de-combined to yield the PIN without a private encryption key).

The security and handling of encrypted PINs within the host system (at the financial institution) is typically performed by a system referred to as a host security module (HSM). For example, the HSM receives an encrypted PIN (e.g., transmitted from a financial terminal where a transaction is being attempted by a consumer), receives the stored PIN offset from financial host, decrypts the transmitted/encrypted PIN and compares it to the stored PIN offset, and then either validates or invalidates the transaction based on the comparison.

The HSM will not accept unencrypted PINs when it operates in its secure mode (when it is in its normal, secure operating condition and is receiving, decrypting, comparing and validating PINS), since there must be a high degree of security and PINs must not be exposed (other than to the HSM) during such operation. The HSM may be selected for a non-secure or "administrative" mode of operation, when it can receive unencrypted PINs, but such mode is the exception (it makes the financial host vulnerable to unauthorized access), and requires manual intervention (e.g., to operate in the administrative mode, it is common to require that two or more different employees to be present, with each having a different key that is separately inputted). There are currently many commercially available HSM systems that may be programmed to operate as just described, with examples being the Host Security Modules 7000 and 8000, sold by Thales e-Security, Inc., Weston, Fla.

The high degree of security surrounding the handling of PINs, such as at an HSM, can make it difficult for a consumer to create a new PIN. Either the PIN must be encrypted into a compatible form that can be accepted by the HSM, or the HSM must be put in a non-secure state. In order to properly encrypt the PIN using encryption techniques and keys compatible with the HSM, the consumer must enter the new PIN at a secure PIN pad device (i.e., a device designed specifically for entry and encryption of PINs), usually located at a bank or other secure location. While this may be feasible if the consumer is at an ATM, bank branch or similar location having a PIN pad, it is not feasible if the consumer desires to change the PIN at a location where there is no secure PIN pad, e.g., when the consumer wants to use a personal computer at home. If the consumer is not using a secure PIN pad, then the financial institution must manually put the HSM into a non-secure mode and, for example, have an employee take the consumer's new PIN and enter it into the financial host while the HSM is in the non-secure mode.

BRIEF SUMMARY OF THE INVENTION

Embodiments of the present invention provide systems and methods for a consumer to create or establish a PIN at a non-secure device, such as a personal computer using a web-based application.

In one embodiment, a method for establishing a PIN includes capturing the PIN from a user at an input device (e.g., personal computer), transmitting the captured PIN from the input device to a host, selecting a base encrypted PIN (e.g., base PIN offset) at the host corresponding to the captured PIN, using an actual identifier (actual account number) to convert the base encrypted PIN to a final encrypted PIN, and storing the final encrypted PIN in the database of the host. Among other things, this enables a consumer/user to establish a PIN on a real-time, on-line basis from a user device (e.g., without the HSM operating in the administrative mode).

A more complete understanding of the present invention may be derived by referring to the detailed description of the invention and to the claims, when considered in connection with the Figures.

DETAILED DESCRIPTION OF THE INVENTION

There are various embodiments and configurations for implementing the present invention. However, before describing those embodiments, an explanation of basic PIN handling will first be described with reference to FIGS. 1, 2 and 3. Such a description will make it easier to understand various terms used in conjunction with later described embodiments of the invention.

Figure 1:
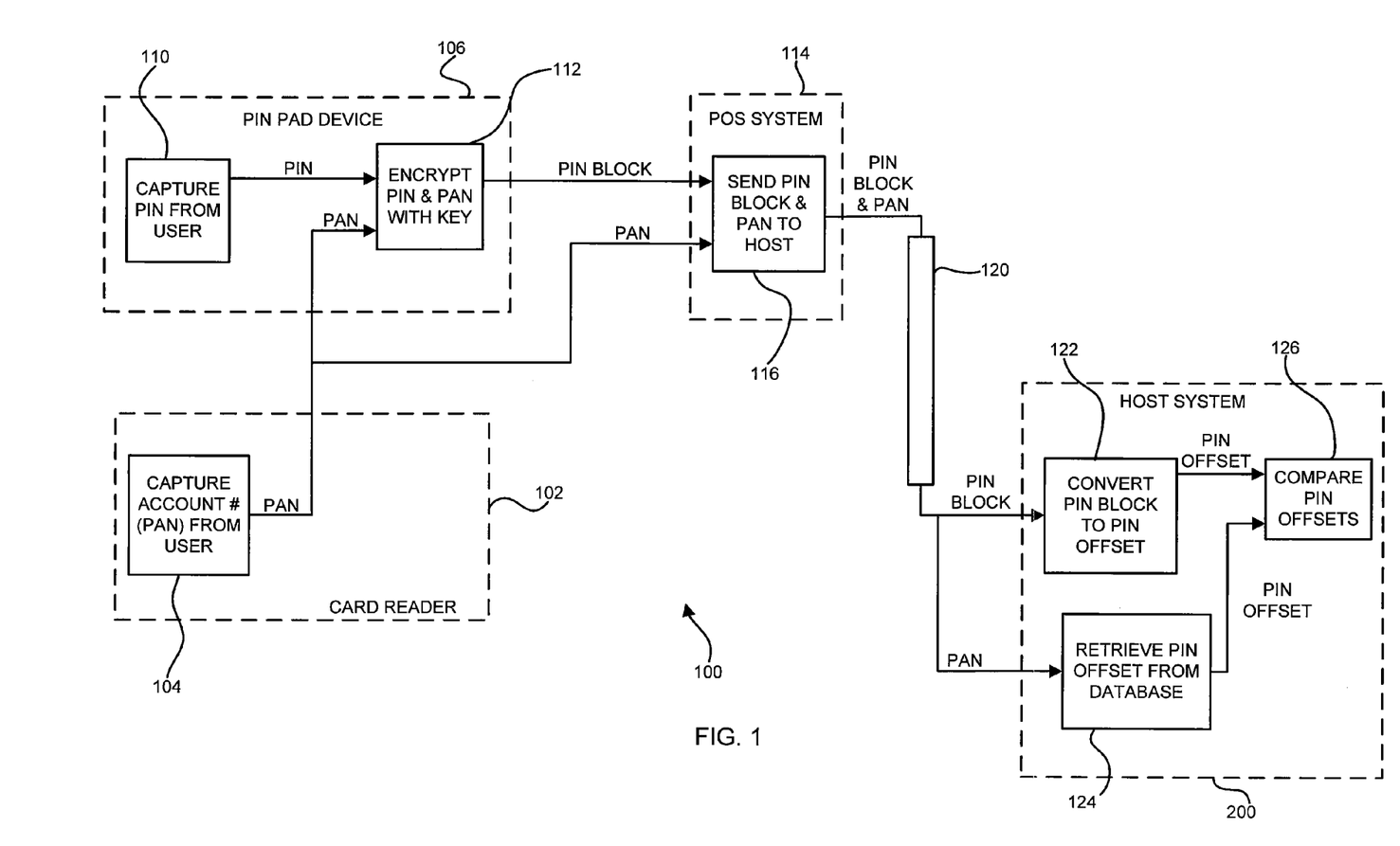
FIG. 1 is a flow diagram illustrating a typical process for the handling a PIN in a financial transaction (and generally illustrating the network over which the flow of data takes place in such a transaction).
Figure 2:
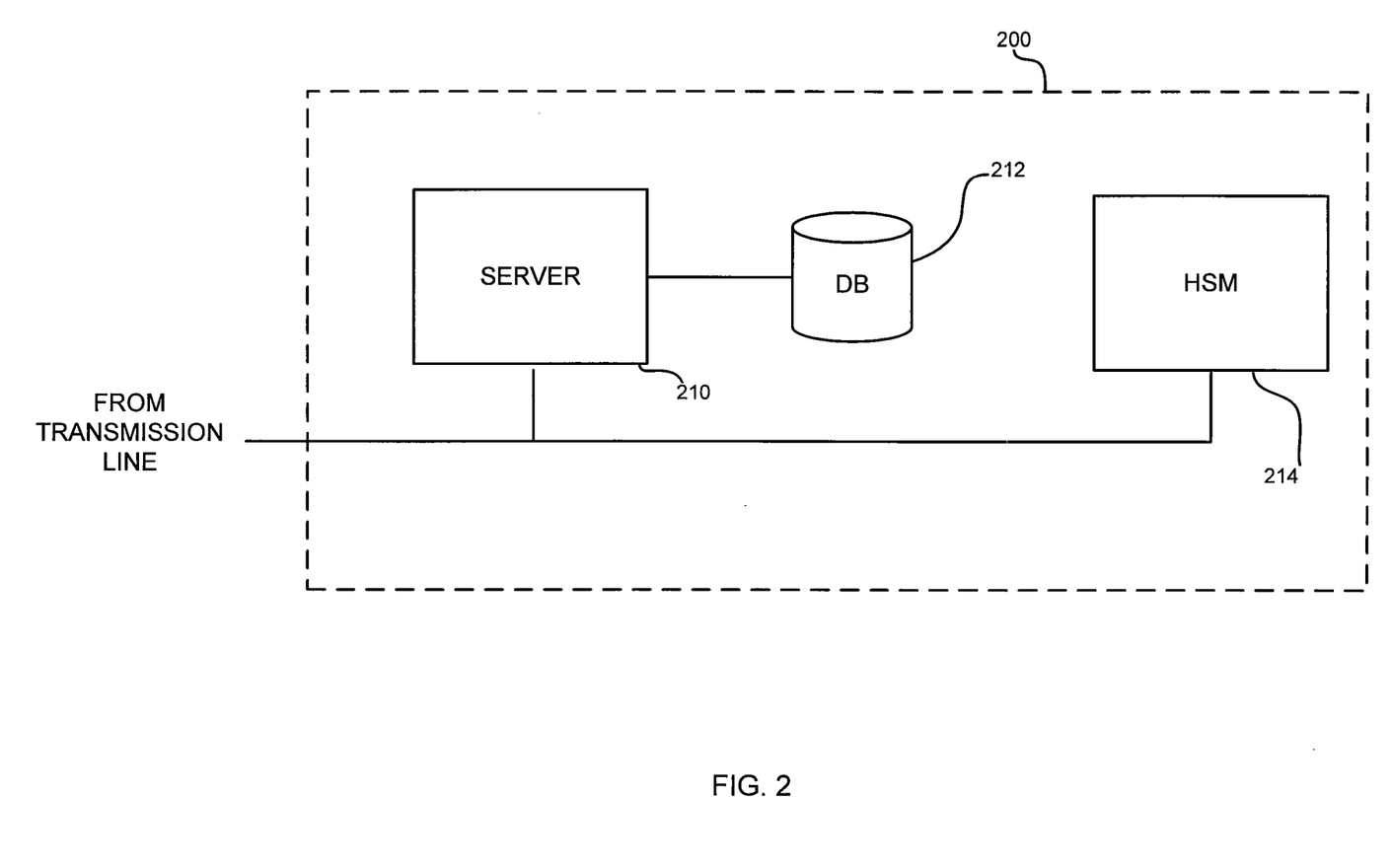
FIG. 2 illustrates a financial host system that could be used with the process of FIG. 1.

An example of typical process for PIN handling in a financial transaction is shown in FIG. 1, which will be described in conjunction with FIG. 2. The transaction illustrated in FIG. 1 represents any one of a number of common card-based transactions, such as a sales transaction at a merchant POS terminal, where a customer swipes a financial card (such as a credit or debit card) and enters a PIN in order to authenticate the transaction (rather than, say, signing a paper receipt). FIG. 2 shows the basic hardware components at a financial host system 200. The system 200 may be located at and operated by a financial institution that maintains and stores PINs for user (customer) accounts.

Referring to FIG. 1, when a transaction is to be initiated, a user account number (also referred to as a primary account number or PAN) is entered or captured at a card reader 102 at step 104, and a PIN is entered or captured at a PIN pad device 106 at step 110. The card reader 102 may be a conventional magnetic stripe reader for capturing the account number from a user's card. The PIN pad device 106 may also be conventional, with a keypad for the user to enter his or her PIN (which has been previously assigned by the card issuer or previously selected by the user). At this point the PIN and the PAN may both exist in clear text form (characters representing the actual, human-readable digits). The PIN pad device takes both the PIN and the PAN and, using a private encryption key, encrypts both into a single string of characters known as a PIN block, step 112. A point of sale (POS) system or server 114 takes the PIN block (from the PIN pad 106) and the account number (PAN) from the card reader and transmits both over a transmission line 120 to the host system 200, step 116. Given that the PIN is encrypted, the transmission line need not be highly secure or encrypted itself. It could be a leased telephone line or similar transmission medium.

The host system 200 includes (as seen in FIG. 2) server 210, a database 212, and a host security module (HSM) 214. The database 212 stores, among other things, encrypted PINs (known as PIN offsets), with one stored PIN offset corresponding to each account number (PAN) for accounts maintained at the financial institution.

When the PIN block and the account number (PAN) are received at the host system 200, they are provided to the HSM 214, and are used (along with a private key at the HSM) to convert or decrypt the Pin block into a PIN offset (step 122). The PIN offset is another encrypted form of the PIN (as originally entered at the key pad 106). At the same time, the PAN is also provided to the server 210, which retrieves from the database the stored PIN offset corresponding to the PAN (step 124). At step 126, the HSM compares the PIN offset that it has previously extracted (at step 122) from the PIN block with the PIN offset that has been previously retrieved (at step 124) from the database. If there is a correct match, the transaction is accepted. If there is not a match, the transaction is declined.

There are, of course, many other possible methods for PIN data to be encrypted. However, for purposes of security, it would normally be preferred that the entered PIN be in an encrypted form (e.g., as a PIN block) before it is transmitted to the host system for validation, and the stored PIN also be in an encrypted form (e.g., as a PIN offset) at the database of the host system. The encrypted PIN block (for transmission) and the encrypted PIN offset (for storage at the host) both include the PIN as an element, but may use different private keys and encryption techniques, as dictated by industry standards and practices.

To further understand the nature of PIN encryption, the following illustrates one example (in a progression of character strings) a PIN block created at the PIN pad using a PIN and a PAN, starting with a clear text PIN and a clear text PAN that are each entered or captured from a user, where each of the clear text PIN and the clear text PAN are padded with certain additional digits, where the padded clear text PIN and padded clear text PAN are combined to create a clear text PIN block, and where the clear text PIN block is then encrypted to form the final PIN block (for transmission to the host system):

Example Chart 1—PIN Block Created from a PIN and a PAN

| | |
|---|---|
| Clear Text PIN<br>(entered at a PIN pad) | 1234 |
| Clear Text PIN Padded (CTPINP)<br>("04" is added at the beginning of<br>the string, and the string of characters<br>"FFFFFFFF" is added at the end) | 041234FFFFFFFFFF |
| Clear Text PAN<br>(received at the PIN pad from a card reader) | 5432109876543210 |
| Clear Text PAN Padded (CTPANP)<br>(at the PIN pad, the first three digits "543"<br>and the last single digit "1" are dropped from<br>the PAN, and "0000" is added at the beginning) | 0000210987654321 |
| Clear Text PIN Block<br>(the CTPINP and CTPANP are combined at the<br>PIN pad using an exclusive OR logical<br>function) | 041215F6789ABCDE |
| PIN Block<br>(the clear text PIN block is encrypted at the PIN<br>pad using a private key) | 063121F8168BCB4B |

To further understand PIN encryption, the following illustrates (in a progression of character strings) the same PIN block and PAN received at the HSM, where the HSM decrypts the PIN block, and converts (re-encrypts) the decrypted PIN block into a PIN offset (which is ready to be compared to a PIN offset stored in the database):

Example Chart 2—PIN Offset from PIN Block and PAN

| | |
|---|---|
| PIN Block<br>(the PIN block received at the HSM) | 063121F8168BCB4B |
| PAN<br>(the PAN received at the HSM) | 5432109876543210 |
| Decrypted PIN Block<br>(the PIN block decrypted at the HSM<br>using a private key) | 041215F6789ABCD |
| PIN Offset<br>(PIN Block converted to a PIN offset<br>(using another private key) for comparison<br>to the PIN offset stored in the database) | 1014FFFFFFFF |

It should be appreciated from the forgoing that the PIN offset is not the same string of characters as the clear text PIN, since the HSM leaves the PIN offset in an encrypted form that would not be recognizable to a human reader, but if desired the PIN offset could be decrypted further by the HSM (using the private key) to yield the PIN if it should be needed.

Figure 3:
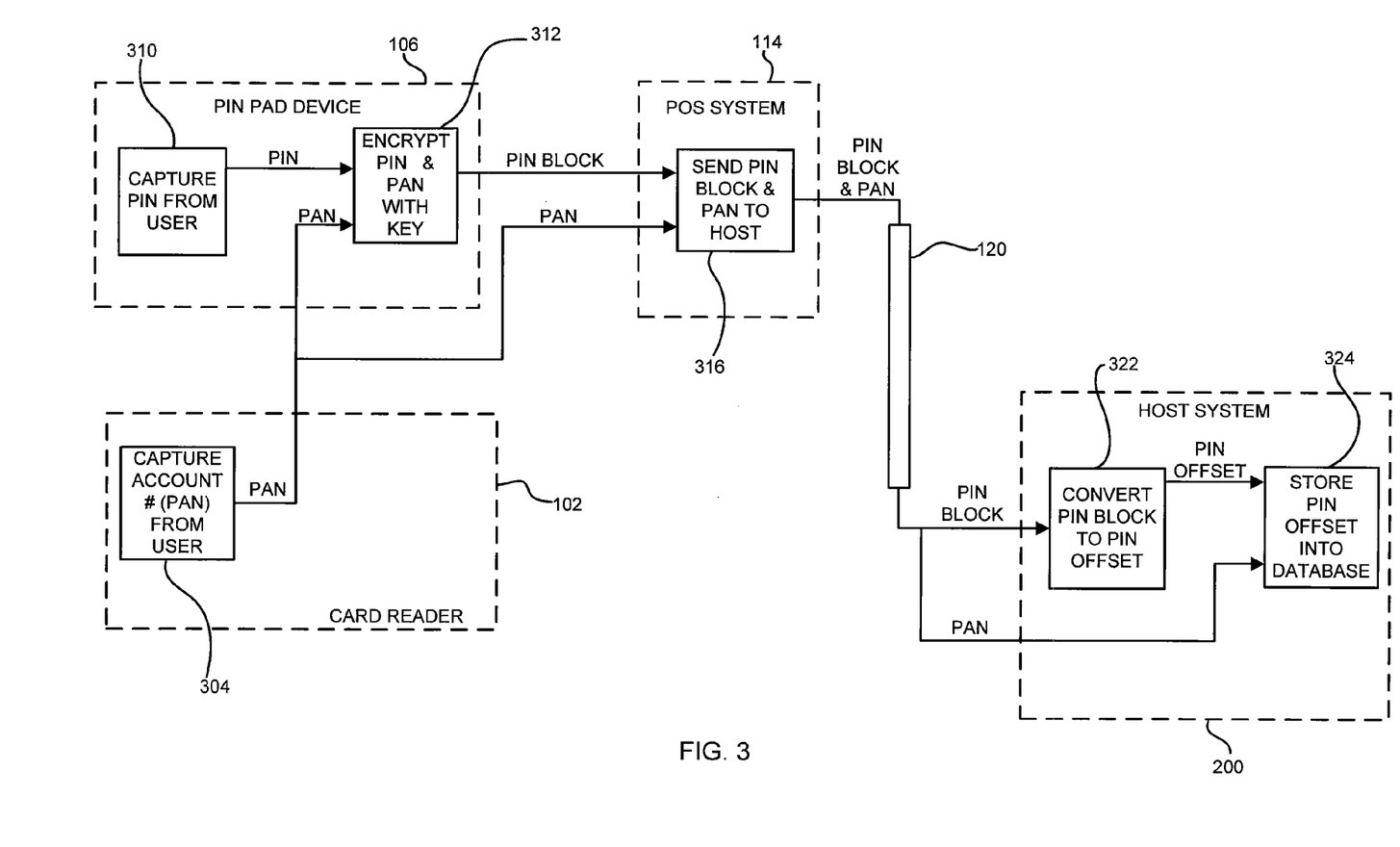
FIG. 3 is a flow diagram illustrating a process used to create a PIN without the features of the present invention.

Having described PIN handling in a typical card-based transaction, there will now be described with reference to FIG. 3 a common method used when the user selects or creates a new PIN. As seen in FIG. 3, the PAN is captured (step 304) at the card reader 102 and the new PIN is entered (step 310) at the PIN pad device 106. The PIN pad takes the PIN and PAN and encrypts them into a PIN block (step 312), and the PIN Block and the PAN are then transmitted (step 316) from the POS system 114 over the transmission line 120 to the host system 200. The HSM 214 (FIG. 2) converts the PIN block to a PIN offset (step 322) and the PIN offset is then stored in the database 212 of the host system (step 324). In the illustrated example, the PIN offset is stored in the database (in relation to the PAN), so that the PIN can be retrieved using the PAN.

As should be appreciated from FIG. 3 and the preceding discussion, common methods for creating a new PIN have required the new PIN be entered at PIN pad 106 (or a similar secure device) for proper encryption of the PIN into a PIN block that can be transmitted to and subsequently decrypted/converted at the HSM into a PIN offset. Unless the HSM 214 has been put into a non-secure state, a clear text PIN cannot be transmitted to and accepted by the host system 200 (and HSM 214).

One embodiment of the present invention will now be described with reference to FIGS. 4, 5 and 6.

Before referencing the details of those figures, it should be mentioned that one feature of the illustrated embodiment is the storage of base PIN offsets in the host system database. Base PIN offsets are temporary or interim PIN offsets, with one base PIN offset corresponding to each possible PIN that could be selected by the user. Thus, as an example, if four digit PINs are permitted, any one of ten thousand possible PINs (0000-9999) could be selected by the user, and thus ten thousand possible base PIN offsets would be stored in the database 212. As a further example, if six digit PINs are permitted, then any one of one million possible PINs (000000-999999) could be selected, and thus one million possible base PIN offsets would be stored in database 212.

The storage and use of base PIN offsets permit a clear text PIN to be transmitted to the host system. As will be explained in greater detail below, the base PIN offsets are created (and stored in the database) in advance, by encrypting each possible PIN (e.g., ten thousand possible PINS if four digit PINs are permitted) using a single base (universal) PAN. When a clear text PIN is received at the host system (along with the user's PAN), the corresponding base PIN offset is retrieved, and that base PIN offset is converted (at the HSM 214) into an actual PIN offset using the user's actual PAN. Thus, a clear text PIN ends up being converted into a PIN offset that can be securely stored in the database (corresponding to the newly selected PIN), without the HSM being manually operated in a non-secure mode.

Figure 4:
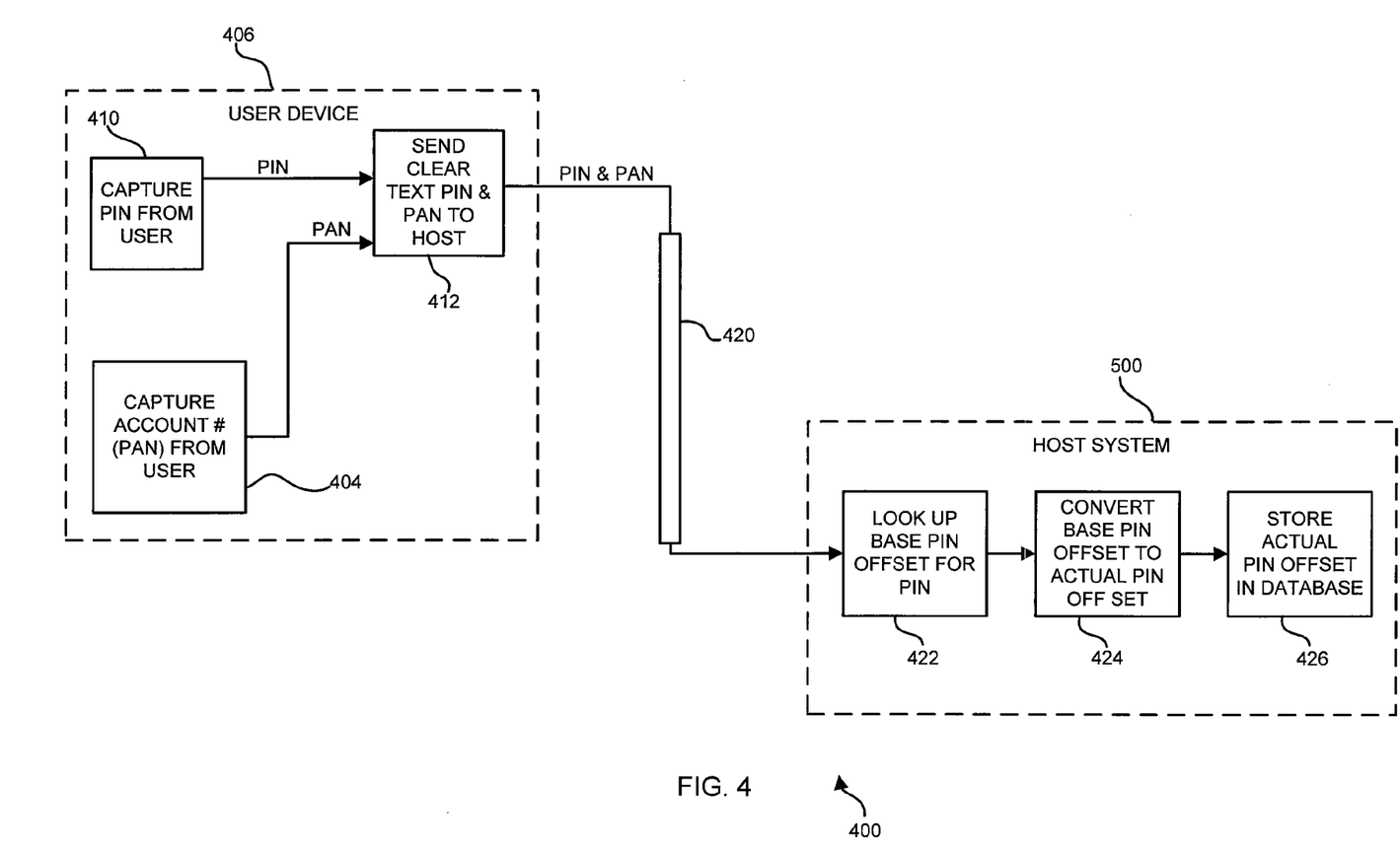
FIG. 4 is a flow diagram illustrating a process for creating a PIN according to one embodiment of the invention.
Figure 5:
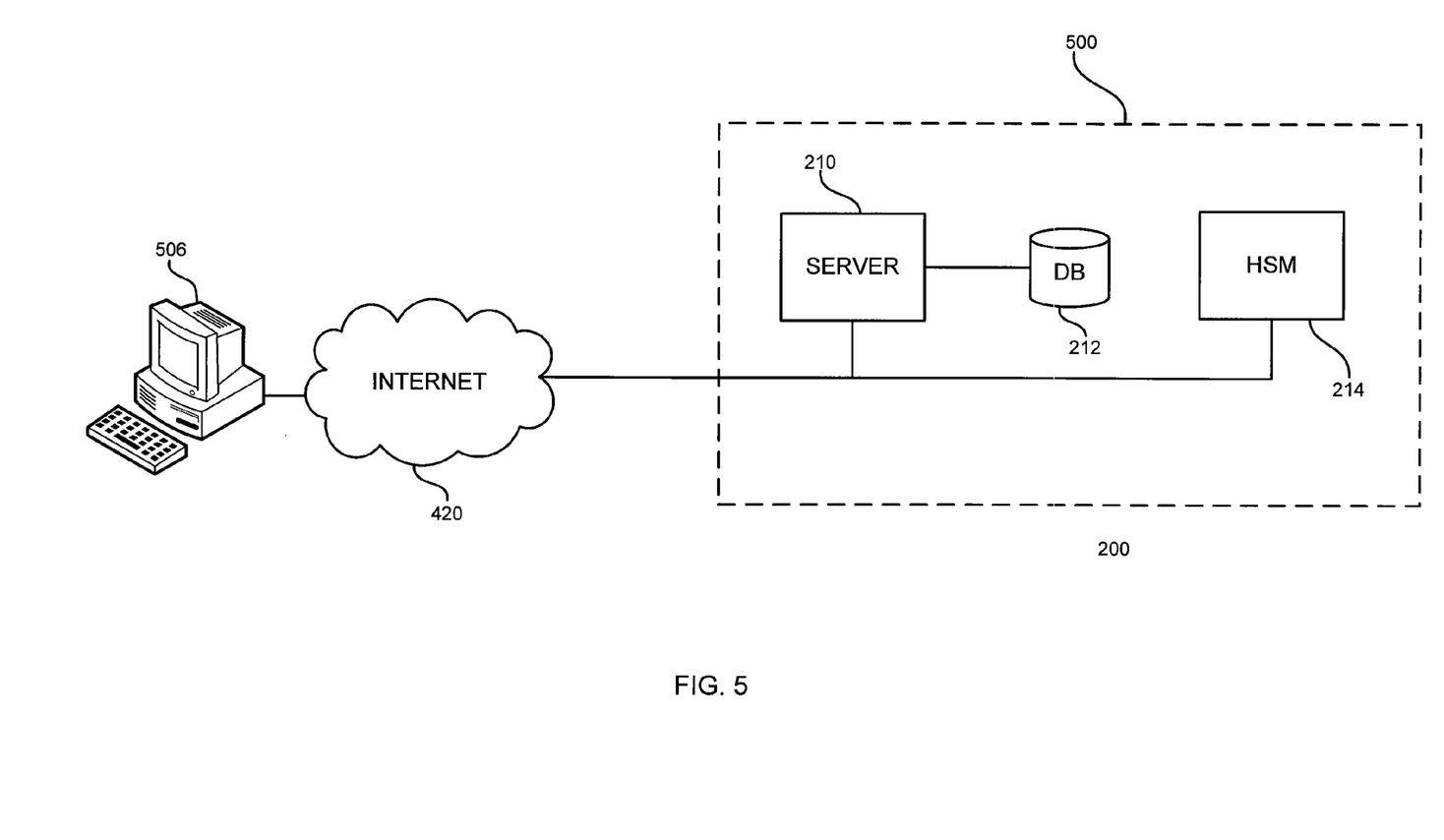
FIG. 5 illustrates a network, including a financial host system of the type seen in FIG. 2, and the flow of data within the network, that could be used with the process of FIG. 4.

Turning now to FIG. 4, there is illustrated a process 400 for selecting a new PIN for a specific user account or PAN, and storing a corresponding PIN offset for that PIN (and account) in the database 212, according to one embodiment of the invention. FIG. 4 will be described in conjunction with FIG. 5, which more specifically illustrates the network used with the process of FIG. 4, including a non-secure user device 406, the host system 500, and a transmission line or medium 420 (e.g, the Internet). The host system 500 can be seen to include the same elements as the earlier described host system 200 (i.e., server 210, database 212 and HSM 214), but is specifically programmed to carry out the novel features illustrated in FIG. 4.

The user first enters his or her account number (PAN) at the user device 406 (step 404). The user device 406 may be, in one example, a personal computer running a web-based application. In such an example, the user (when desiring to change a PIN) could use the device 406 to access the host system 500 from his home, and without having to visit an ATM, bank, retail store or other location where a secure device (e.g., PIN pad 106) is present. The user enters his/her PAN (step 404) and enters the new PIN (step 410). The clear text PIN and PAN are transmitted at step 412 over a transmission medium 420 (e.g., the Internet) to the host system 500. The server 210 uses the PIN to look up in database 212 the corresponding (and pre-calculated) base PIN offset for that PIN (step 422), and provides the base PIN offset and the PAN to the HSM 214. The HMS 214 uses the PAN to convert the base PIN offset to a real or actual PIN offset (step 424) that not only corresponds to the new PIN, but also the actual PAN of the user. The actual PIN offset is then stored in the database (step 426) so that it may be used thereafter to validate PINs entered by the user in subsequent card-based transactions.

Figure 6:
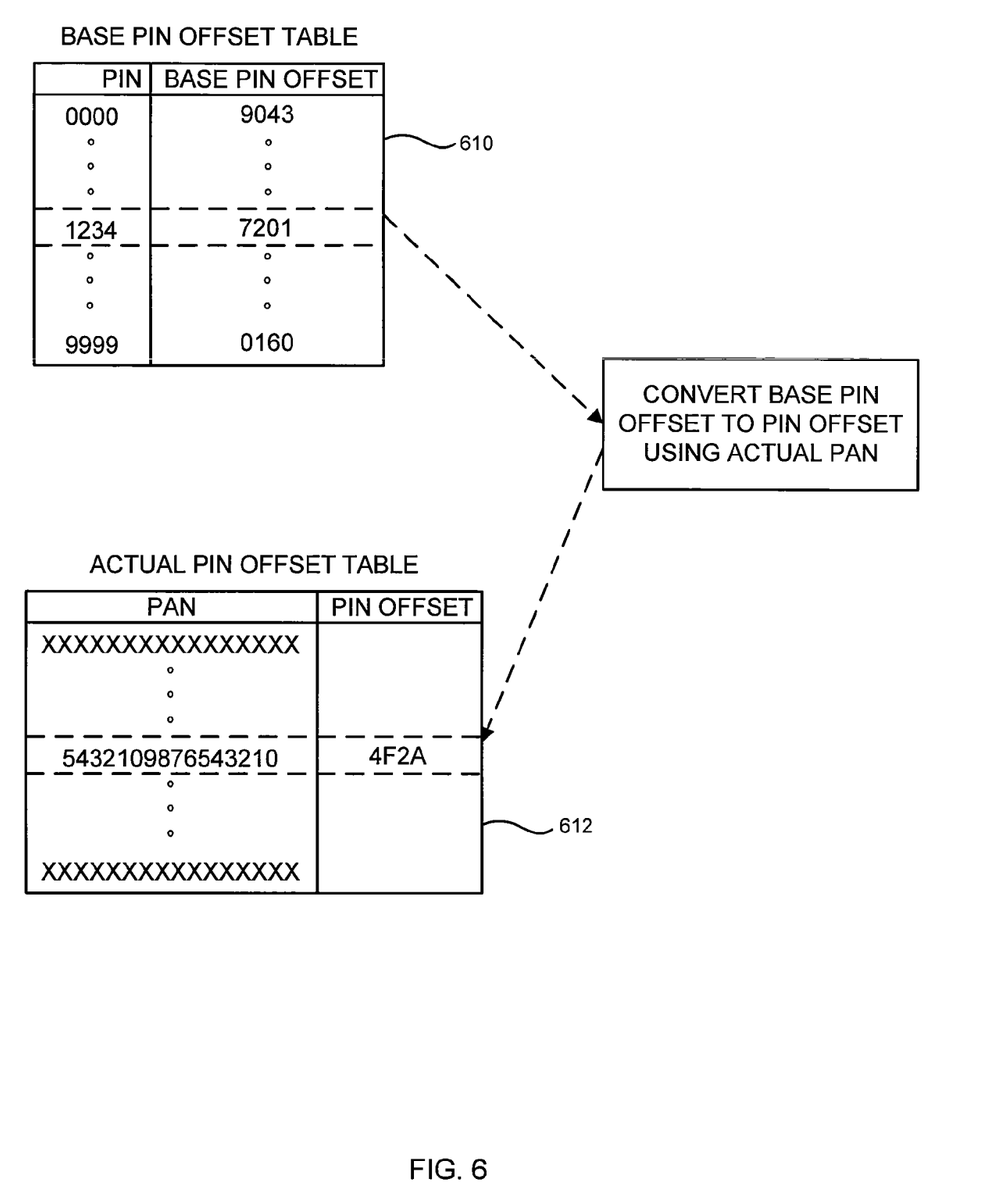
FIG. 6 illustrates two database tables (a Base PIN Offset Table and an Actual PIN Offset Table) in the database of the host system seen in FIG. 5.

FIG. 6 illustrates two tables in the database 212, a Base PIN Offset Table 610 and an Actual PIN Offset Table 612. The Table 610 stores base PIN offsets (a base PIN offset corresponding to each possible PIN) and Table 612 stores actual PIN offsets (the actual PIN offsets corresponding to each user account number or PAN). Thus, in Table 612 the PIN offsets represent (in encrypted form) original PINs assigned by a financial institution to users, or PINs that have subsequently been selected and substituted by users (replacing original PINs).

It is assumed in FIG. 6 that PINs are all four digits, and thus there are ten thousand possible base PIN offsets in Table 610, one corresponding to each of ten thousand possible PINS (0000-99999). As should be apparent, Table 612 could be a conventionally configured with a single PIN offset for each PAN, with the number of PANs depending on the number of accounts maintained by the financial institution.

FIG. 6 further illustrates the selection of a new PIN by a user and the creation of an actual PIN offset corresponding to the new PIN. Specifically, for the PIN "1234" (illustrated previously above in connection with Example Charts 1 and 2), a base PIN offset "7201" has been stored in Table 610. In the illustrated Table 610, each and every base PIN offset has been created (as will be described in greater detail below) using a single base or universal PAN. In the present embodiment, any predetermined base PAN could be used, as long as that same base PAN is used for creating all base PIN offsets. As a first step in converting the base PAN offset into an actual PIN offset, the HSM 214 takes the base PIN offset ("7201") and, knowing that it has been created using the predetermined base PAN, then uses a private encryption key to extract the actual PIN ("1234"). The HSM then encrypts the actual PIN ("1234") into an actual PIN offset corresponding to the actual PAN ("5432109876543210") by using the same private encryption key. Thus the actual PIN offset is stored in the Table 612 corresponding to the actual PAN.

Figure 7:
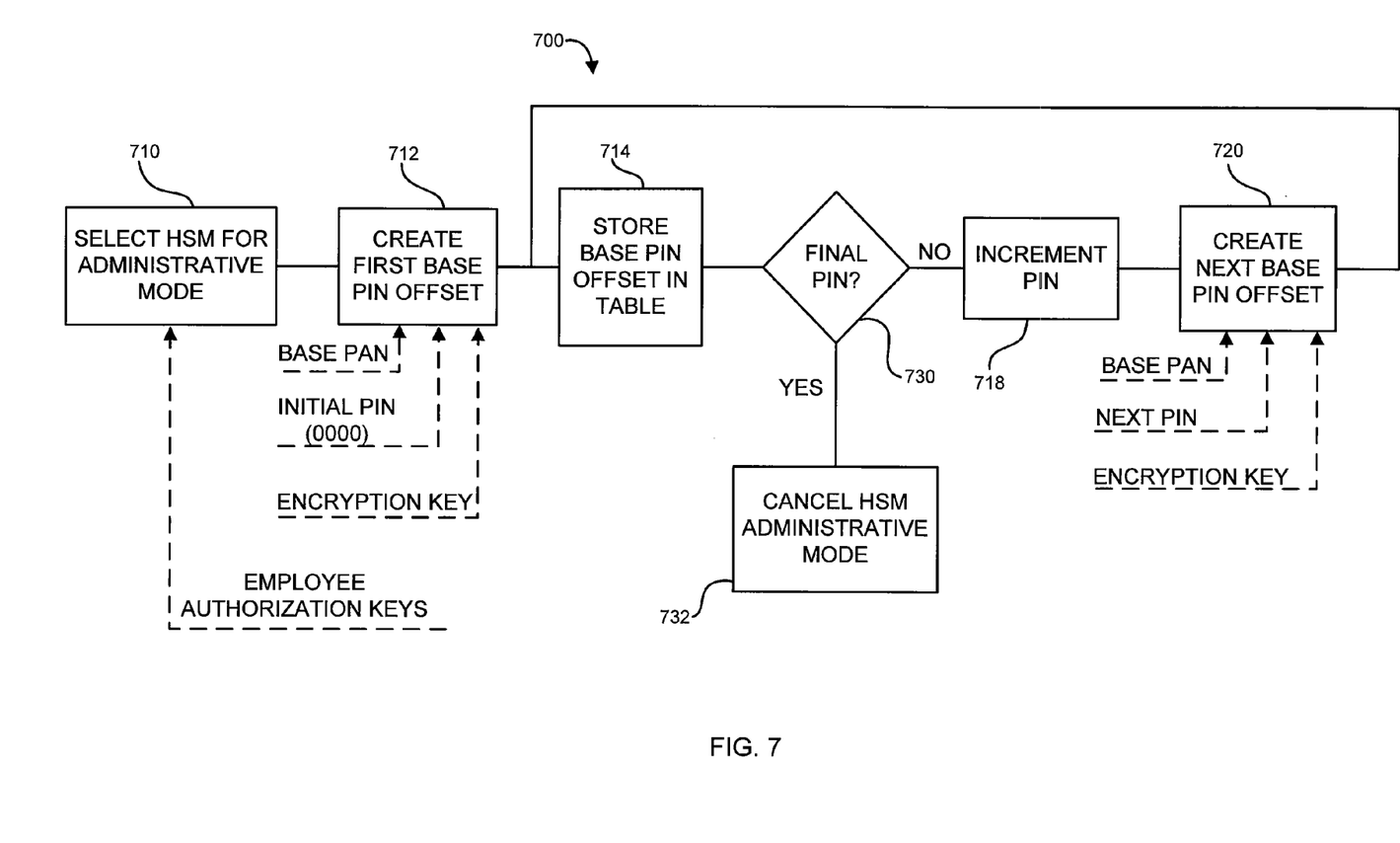
FIG. 7 is a flow diagram illustrating the creation of base PIN offsets in the Base PIN Offset Table of FIG. 6.

FIG. 7 illustrates the program steps in a process 700 executed by the server 210 and HSM 214 in order to create the base PIN offsets that are stored in database Table 610.

Initially, at step 710, the HSM is put into administrative mode, in order to enable the HSM to generate PIN offsets using a clear text PIN as an input. As mentioned earlier, and as illustrated in FIG. 7, the HSM 214 can be put into an administrative mode (non-secure mode) when two employees having authorization keys input those keys into the HSM. In the described embodiment this is done only once, i.e., when needed to create and store all possible base PIN offsets in the Table 612. Once the HSM is in the administrative mode, it creates the first base PIN offset, based on inputs of the base PAN and the initial PIN ("0000") provided by the server 210, and the HSM encryption key. The encryption key may be already stored in the HSM or may be provided by the server 210 for purposes of creating the base PIN offset. It is the same key that is later used to convert base PIN offsets into actual PIN offsets (step 424, FIG. 4).

Once the first base PIN offset is created at the HSM, it is provided to the server 210 for storage in Table 610 of the database 212 (step 714). The first base PIN offset is stored to correspond with the initial PIN ("0000") in Table 610 (FIG. 6). The server 210 increments the PIN (step 718), and the HSM creates the next base PIN offset, with inputs being the base PAN, the next (incremented) PIN, and the encryption key (step 720). The process repeats, with each subsequent base PIN offset stored in the Table 610 at step 714 (based on incrementing PINs from the server 210) until the last or final PIN is reached (step 730), at which time no further base PIN offsets remain and the administrative mode for the HSM is cancelled (step 732).

While a detailed description of presently preferred embodiments of the invention have been given above, various alternatives, modifications, and equivalents will be apparent to those skilled in the art without varying from the spirit of the invention. As an example, while base PIN offsets are illustrated as being created using a single base PAN, other methods would be available for creating the Table 612 (such as a predetermined base number or code rather than an actual account number), provided that the HSM is able to use an account number or other identifier corresponding to the account to convert the base PIN offset into an actual PIN offset. Further, while the description includes exemplary methods for creating PIN blocks and PIN offsets, many other methods are possible for encrypting and decrypting PINs. Also, while a four digit PIN is shown in FIG. 6 for purposes of illustrating the base PIN offsets in Table 610, PINs may be other lengths (e.g., any even or odd number of digits), could be variable in length, and could be alpha-numerical or in other forms (e.g., user bio-metric measurements). Therefore, the above description should not be taken as limiting the scope of the invention, which is defined by the appended claims.

What is claimed is:

1. A method for establishing a user-selected PIN to be associated with an identifier and to be stored at a host computer, and to be subsequently used to authenticate transactions conducted by the user, wherein the host computer includes a database that stores PINs in encrypted form, the method comprising:

receiving, at the host computer, a user-selected PIN that has been captured from a user at an input device;

creating and encrypting a plurality of base PINs at the host computer, each of the encrypted base PINs corresponding to one of a plurality of all possible permitted PINs for selection by the user, and each of the encrypted base PINs created using a single, same base number;

selecting, from the plurality of encrypted base PINs, an encrypted base PIN at the host computer corresponding to the captured user-selected PIN;

using the identifier to convert the selected encrypted base PIN to a final encrypted PIN; and storing the final encrypted PIN in the database of the host computer in association with the identifier, for subsequent use in authenticating transactions.

2. The method of claim 1, wherein the captured PIN is an inputted clear text PIN.

3. The method of claim 2, wherein the clear text PIN represents human recognizable characters.

4. The method of claim 3, wherein the clear text PIN is a string of alphanumeric characters.

5. The method of claim 1, wherein the captured PIN is based on user biometrics.

6. The method of claim 1, wherein the encrypted PINs stored in the database are PIN offsets, wherein the encrypted base PIN is a base PIN offset, and wherein the final encrypted PIN is a final PIN offset.

7. The method of claim 1, wherein the host computer further includes a security device that may operate in a mode for receiving PINs in encrypted form.

8. The method of claim 7, wherein the security device is a host security module (HSM), wherein the mode for receiving PINs in encrypted form is a secure mode, and wherein the HSM accepts PINs only in encrypted form in the secure mode.

9. The method of claim 8, wherein the HSM in the secure mode receives an encrypted PIN in the form of PIN block when a user conducts a transaction and enters a PIN, and wherein the HSM converts the PIN block into a PIN offset in order to compare the converted PIN offset to a PIN offset stored in the database.

10. The method of claim 9, wherein the PIN block received at the HSM is transmitted to the host computer by a secure input device that converts a PIN entered by the user into a PIN block.

11. The method of claim 10 wherein the secure input device is a PIN pad.

12. The method of claim 10, wherein the identifier is an account identifier, wherein the account identifier is transmitted to the host computer with the PIN block, and wherein the HSM uses the account identifier and a private key to convert the PIN block into a PIN offset.

13. The method of claim 1, wherein the identifier is an account identifier.

14. The method of claim 13, wherein the PIN and account identifier are both associated with a financial account.

15. The method of claim 14, wherein the account identifier is a PAN.

16. The method of claim 15, wherein the input device at which the PIN is captured is a non-secure input device that does not encrypt the PIN into a PIN block.

17. The method of claim 16, wherein the non-secure device is a personal computer that is connected to the host computer via the internet.

* * * * *